US012800907B2

(12) United States Patent
Salisbury et al.

(10) Patent No.: US 12,800,907 B2
(45) Date of Patent: Nov. 17, 2026

(54) OPTICAL DATA INSERTION

(71) Applicant: Thermoteknix Systems Limited, Cambridge (GB)

(72) Inventors: Max Salisbury, Cambridge (GB); Richard S. Salisbury, Cambridge (GB)

(73) Assignee: Thermoteknix Systems Ltd., Cambridge (GB)

( * ) Notice: Subject to any disclaimer, the term of this patent is extended or adjusted under 35 U.S.C. 154(b) by 273 days.

(21) Appl. No.: 18/609,642

(22) Filed: Mar. 19, 2024

(65) Prior Publication Data

US 2025/0060578 A1 Feb. 20, 2025

Related U.S. Application Data

(63) Continuation-in-part of application No. 18/235,107, filed on Aug. 17, 2023, now Pat. No. 12,591,127.

(30) Foreign Application Priority Data

Mar. 11, 2024 (EP) .................................... 24162777

(51) Int. Cl.

*G02B 23/00* (2006.01)
*F41G 1/393* (2006.01)
*G02B 5/02* (2006.01)
*G02B 7/02* (2021.01)
*G02B 23/12* (2006.01)

(52) U.S. Cl.

CPC ........... *G02B 23/145* (2013.01); *F41G 1/393* (2013.01); *G02B 5/0252* (2013.01); *G02B 5/0278* (2013.01); *G02B 7/021* (2013.01); *G02B 23/12* (2013.01)

(58) Field of Classification Search

CPC .. G02B 23/145; G02B 5/0252; G02B 5/0278; G02B 7/021; G02B 7/023; G02B 23/12; F41G 1/393
USPC .......................................................... 359/642
See application file for complete search history.

(56) References Cited

U.S. PATENT DOCUMENTS 4,076,978 A 2/1978 Brennan et al.
6,031,604 A 2/2000 Pniel
6,304,372 B1 * 10/2001 Spink .................... G02B 21/22 359/368
7,355,790 B1 4/2008 Wagner et al.

FOREIGN PATENT DOCUMENTS

FR 2688320 A1 * 9/1993 ............... G01N 3/42
GB 2472516 B 3/2015

OTHER PUBLICATIONS

Search Report dated Apr. 3, 2023, in connection with GB2214581.7.

* cited by examiner

*Primary Examiner* — William Choi
(74) *Attorney, Agent, or Firm* — Downs Rachlin Martin PLLC

(57) ABSTRACT

A viewer for an optical data insertion device and a combined system comprising a viewer and an optical data insertion device. The optical data insertion device comprising a projector operable to project a visible image and a light guiding device operable to direct light from the projector into the viewer. The viewer comprising an objective lens, an eyepiece lens and a diffuser screen provided between the objective lens and the eyepiece lens.

17 Claims, 6 Drawing Sheets

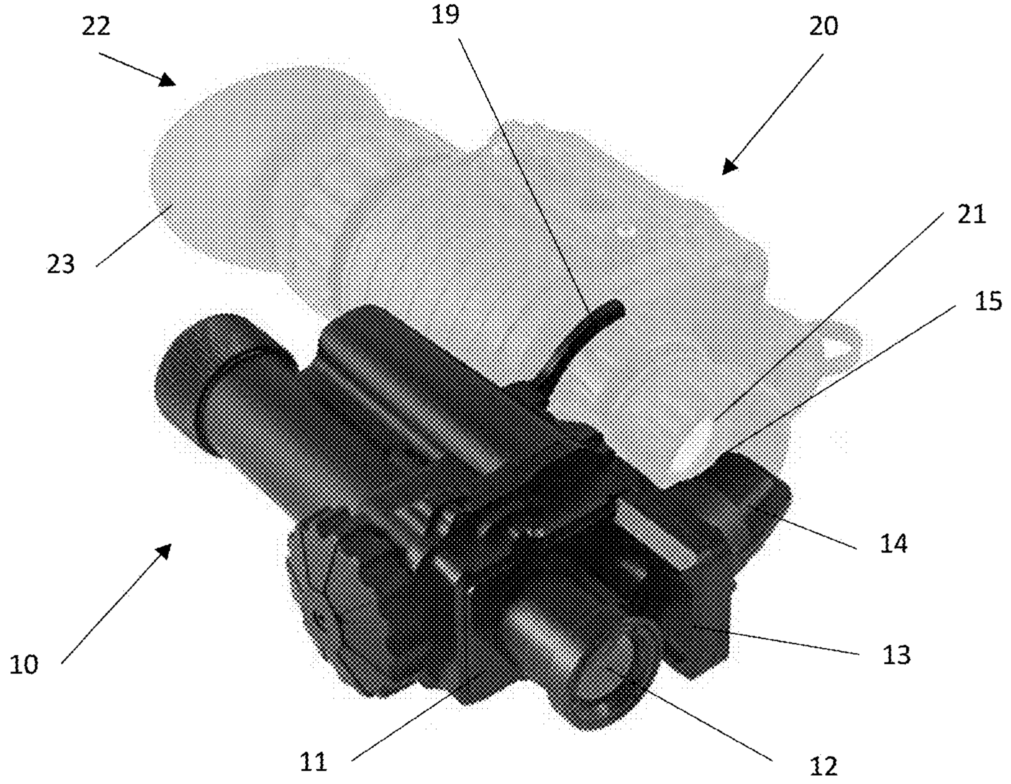
Figure 1 – PRIOR ART
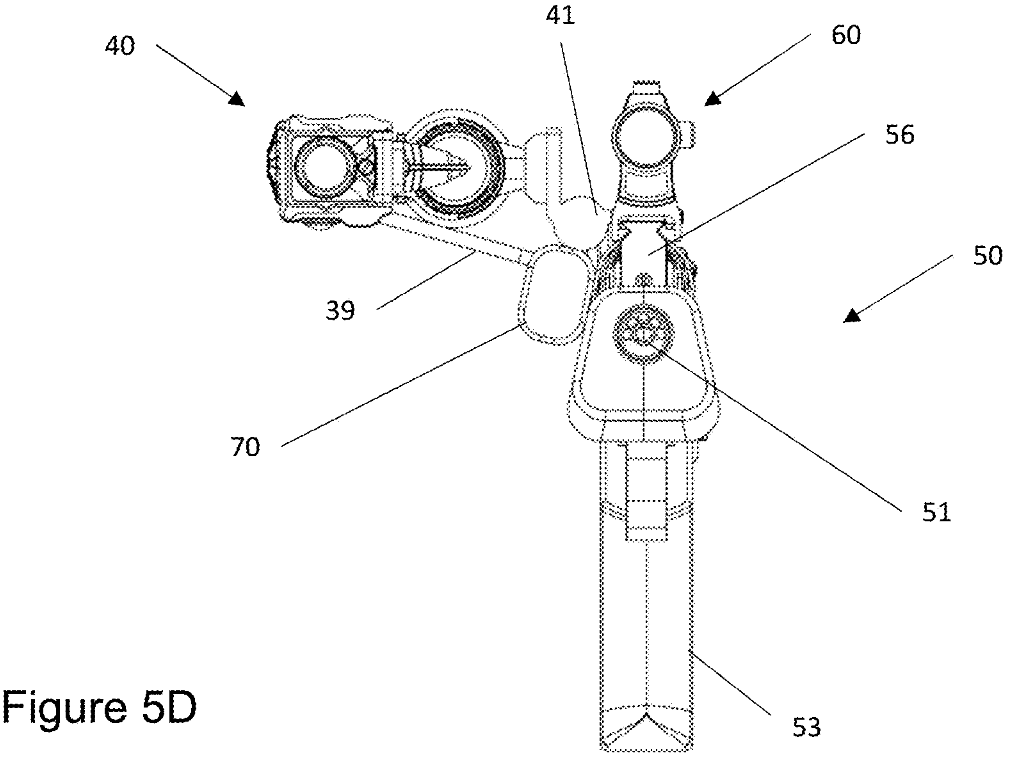
Figure 5D

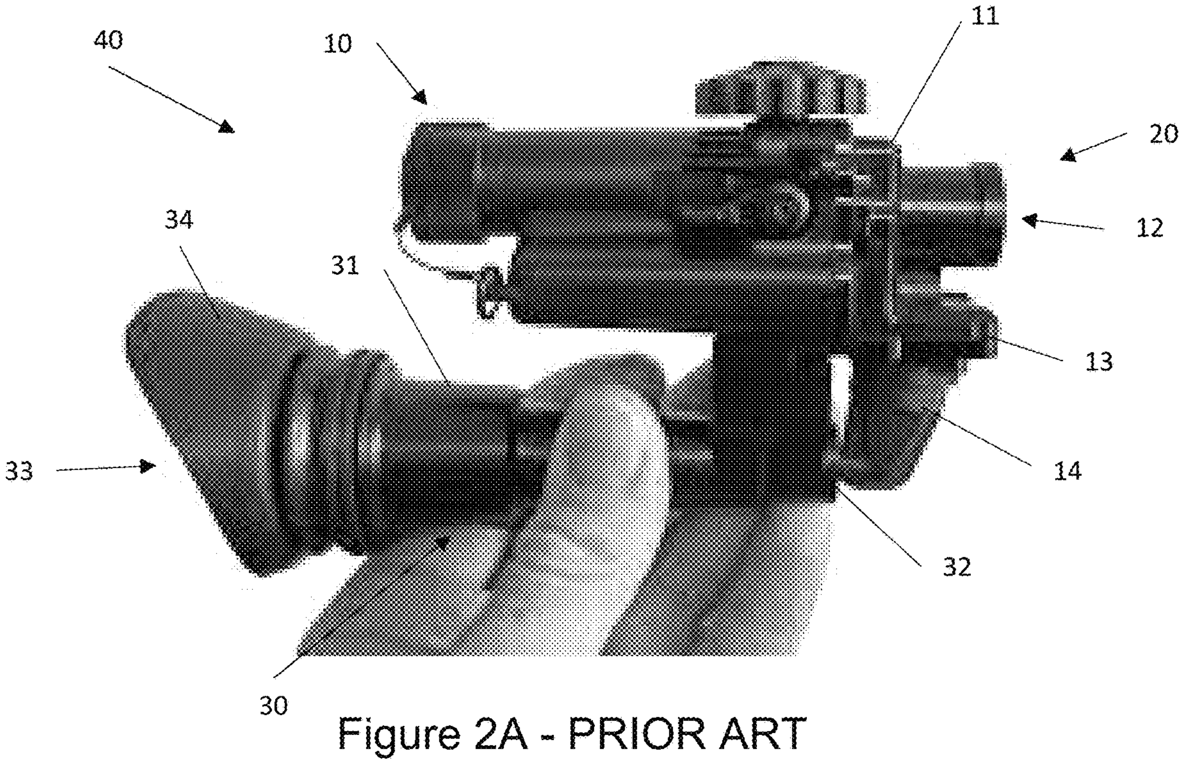
Figure 2A - PRIOR ART
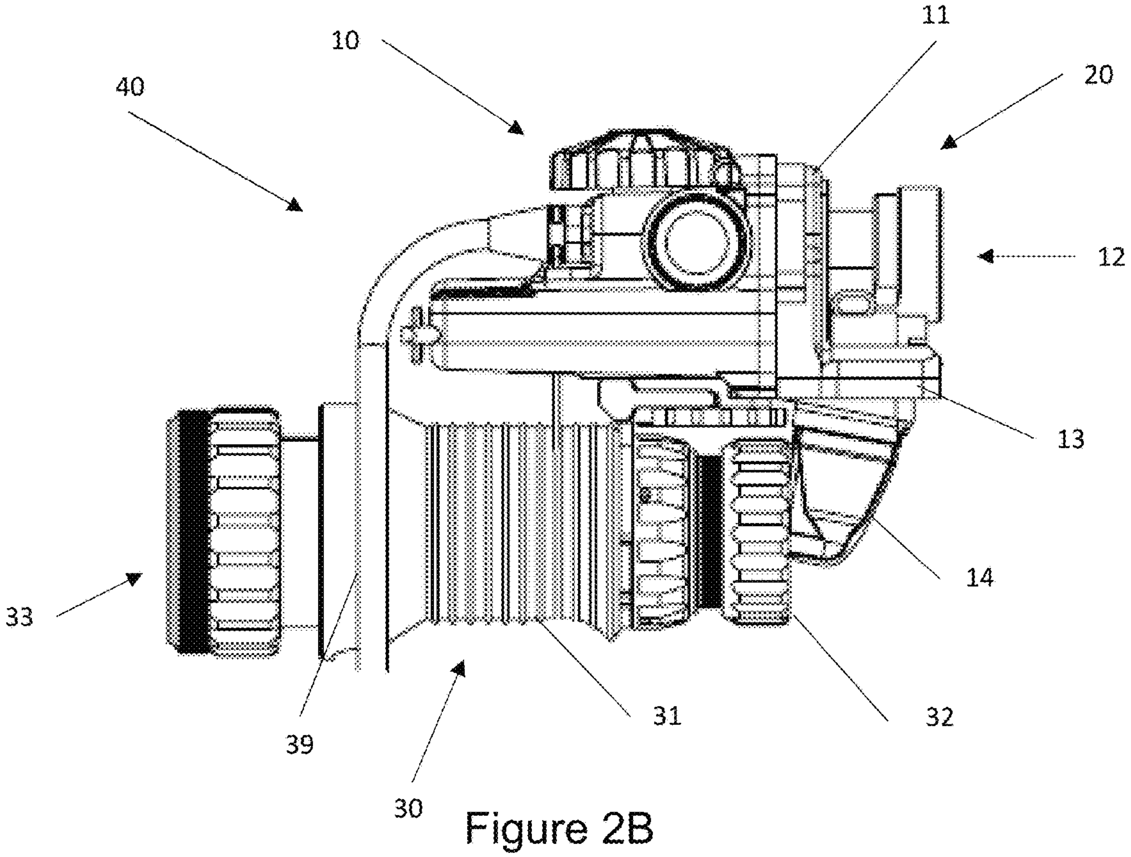
Figure 2B

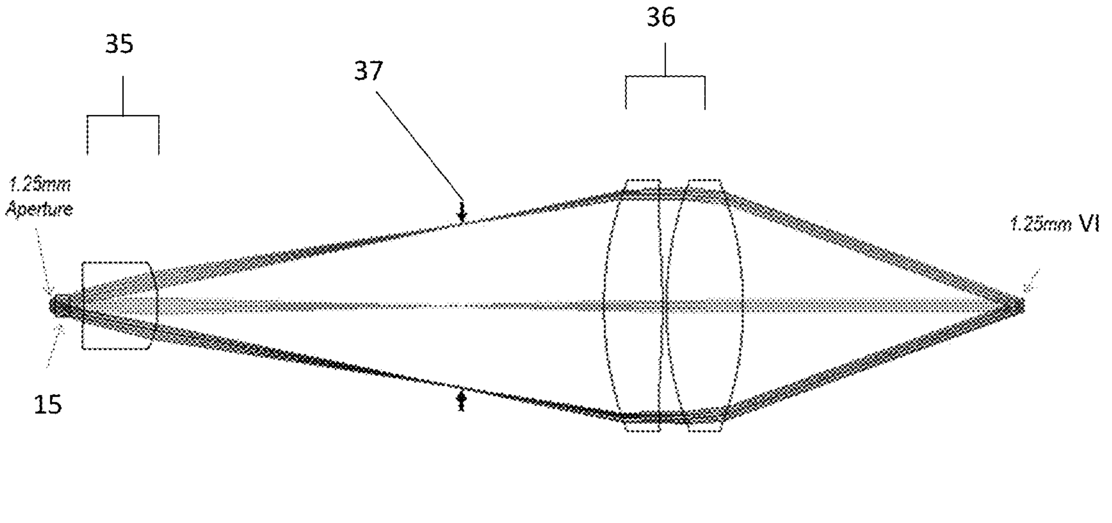
Figure 3A - PRIOR ART
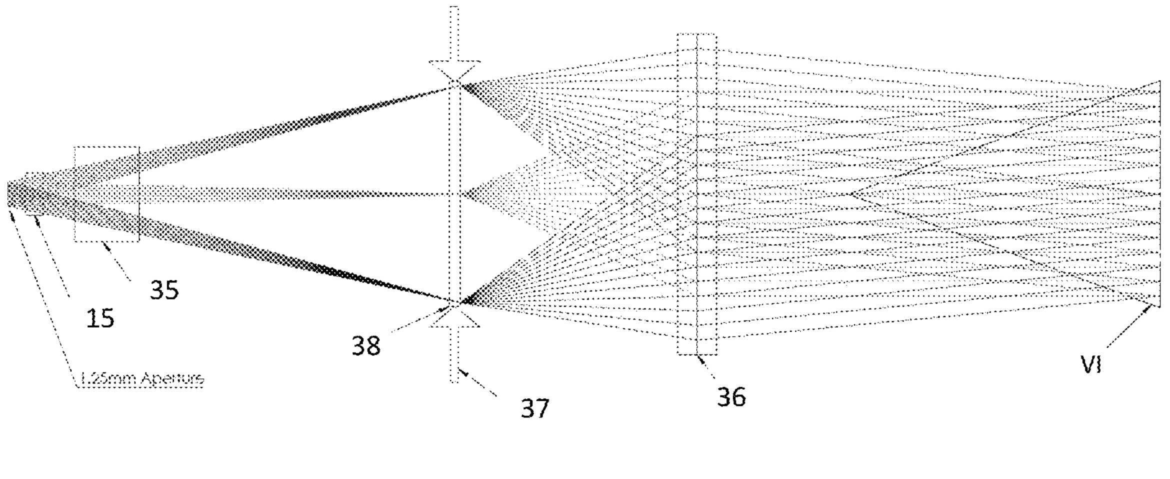
Figure 3B

OPTICAL DATA INSERTION

RELATED APPLICATION DATA

This application is a continuation-in-part of U.S. Non-provisional patent application Ser. No. 18/235,107, filed on Aug. 17, 2023; which application claims priority to GB2214581.7 filed on Oct. 4, 2022, and titled “Optical Data Insertion”. The instant application claims priority to EP24162777.7, filed on Mar. 11, 2024, and titled “Optical Data Insertion”. Each of these applications is incorporated by reference herein in its entirety.

TECHNICAL FIELD OF THE INVENTION

The present invention relates to data insertion into an optical system. In particular, the present invention relates to a viewer for an optical data insertion device and to a combined system comprising a viewer and an optical data insertion device.

BACKGROUND TO THE INVENTION

In certain circumstances it may be desirable to combine image information from two or more sources to provide a composite image. One such occasion is where it is desirable to provide text data (such as range or similar) over an image. Another such occasion is where it may be desirable to combine image data from different sources to provide an enhanced combined image.

An example of combining images is outlined in GB2472516A. In this document, an image intensifier is provided with an optical data insertion device in the form of a clip on attachment. The optical data insertion device comprises a thermal imager, a projector operable to project a visible image captured by the thermal imager and a light guiding device which directs light from the projector into the aperture of the image intensifier. In this manner light from the thermal imager and the image intensifier may be combined to provide a single image.

In order to provide optimal injection performance, the optical data insertion device must direct light into and along the optical axis of the aperture of the first device. In order to minimise the obstruction to the aperture, the light guiding device must be a thin as possible. This necessitates that the light guiding device has an exit aperture with a small numerical aperture (NA).

The above approach works well when optical data is injected into an image intensifier, partly because of the specific characteristics of tube-based intensifiers. The small NA is however problematic if it is desired to view the inserted optical data without an image intensifier for instance though a viewer device, sight or the like or (not recommended) by direct observation.

Typically, a user might seek to use a viewer device to enable inserted optical data to be overlaid on a visible scene. A viewer device offering reasonable eye relief might comprise an objective lens and an eyepiece lens. The objective lens can receive light from the light guiding device output aperture and thereby construct a real image within the viewer which is then presented as a virtual image to the eye via the eyepiece lens. The size of the virtual image of the injected data at the eye is determined by the effective aperture size and the magnification of the viewing system. For a system with unity magnification, the virtual image of the injected data is essentially the same size as the exit aperture of the light guiding device (~1 mm). Accordingly, the inserted data can only be seen if the eye and light guiding device are precisely aligned.

Prior art viewers do not permit incorporating a further optical device and may present an image of the light guiding device to the user.

It is therefore an object of the present invention to provide an optical device that at least partially overcomes or alleviates the above problems.

SUMMARY OF THE INVENTION

According to a first aspect of the present invention there is provided a viewer device for use with an optical data insertion device of the type comprising a projector operable to project a visible image and a light guiding device operable to direct light from the projector into another optical device, the viewer device comprising: an objective lens, an eyepiece lens and a diffuser screen provided between the objective lens and eyepiece lens.

In the present invention, the diffuser screen re-emits or scatters the inserted light from a point in the real image constructed by the objective lens into a wide cone of light not dependent on the incoming angle. This effectively regenerates an expanded inserted image with a numerical aperture (NA) equivalent to the diffuser screen size rather than the exit aperture of the light guiding device. The diffuser screen image is thus visible over a wider viewing aperture than would be the case for the exit aperture of the light guiding device.

The diffuser screen may be provided at the real image plane of the objective lens. This limits distortion of the inserted optical data.

The diffuser screen may be provided within a field stop aperture. This prevents off axis rays from adversely impacting operation. The diffuser screen may be arranged substantially perpendicular to the optical axis of the viewer device.

The viewer device may be positioned relative to the light guiding device such that the light emitted from the light guiding device is directed substantially into the centre of the objective lens and/or is substantially aligned with the optical axis of the viewer device. This limits the potential for clipping or distortion of the inserted optical data.

The diffuser screen may be highly transmissive. The diffuser screen may have a structure that is not visible to the human eye at the level of magnification provided by the eyepiece lens. This prevents the structure of the screen distracting a viewer from the inserted optical data.

The viewer device may have an overall magnification of the order of unity. In other embodiments, the viewer device may have an overall magnification selected to suit the specific requirements of the viewer device.

In one embodiment, the diffuser screen comprises a fibre bundle. The fibre bundle may comprise an array of optical fibres arranged such that the respective fibre ends are arranged in a common plane. Such fibre bundles may comprise of the order of, say, 10,000-100,000 individual fibres, with each individual fibre having a diameter of the order of 1 μm-100 μm. In such fibre bundles, light incident on one end of each fibre is subsequently re-emitted at the other end of the fibre, with relatively low loss. The angle of light re-emitted out of the fibre is strongly correlated to the incident angle, but randomly oriented to the fibre axis. Accordingly, such a screen may not be suitable for viewing at a significant distance, but given the practical considerations on the size of a viewer device, this drawback is not especially significant in the present invention.

The fibres comprising the fibre bundle may each have a diameter of, say, 4 μm or less. The fibres comprising the fibre bundle may each have a diameter of, say, 2.5 μm or less. In such fibre bundles, the fibres themselves are generally not evident even under magnification.

The fibre bundle may be an elongate fibre bundle. In such embodiments, the axial length of the fibres may be of the same order as or long relative to the transverse extent of the diffuser screen. This provides a relatively thick diffuser screen. Whilst this may not be optimal in terms of providing a compact device, it may permit other benefits. In some such embodiments, the elongate fibre bundle is a twisted fibre bundle. In particular, the elongate fibre bundle may be an inverting twisted fibre bundle. In such an embodiment, the fibre bundle is twisted around the elongate axis of the fibres. This has the effect that light incident towards an edge of one end of the twisted fibre bundle is re-emitted from towards an opposing edge of the other end of the twisted fibre bundle. In this manner, the twisted fibre bundle can effectively invert an image. This can be beneficial where it is desired to invert an image and/or to compensate for any image inversion characteristics of the viewer device. In some such embodiments, the ratio of axial length of the fibres to the transverse extent of the screen may be in the range of say 5:1 to 1:2, 3:1 to 3:4, or 2:1 to 1:1. The fibre bundle may be a fibre plate. In such instances, the axial length of the fibres may be short relative to the transverse extent of the diffuser screen. This provides a relatively thin diffuser screen and thereby has the benefit of making the device more compact relative to use of a thicker diffuser screen. in some instances, a fibre plate can be cut from an elongate fibre bundle. In some such embodiments, the ratio of axial length of the fibres to the transverse extent of the screen may be in the range of say 1:100 to 1:5, 1:50 to 1:10 or 1:25 to 1:12.

In another embodiment, the diffuser screen may comprise ground glass. Such screens comprise a glass pane wherein each surface has been ground by a suitable grit. The smooth surface of the glass thus has a disrupted structure, due to interaction with the grit in the grinding process. The disputed structure causes incident light to be refracted at a variety of different angles.

The characteristic size of the structural disruptions is related to the size of the of the grit particles used for grinding. As such, the structural disruption of the surface is typically defined in terms of the grit particle size used for grinding. The grit particle size may be in the range 120-600 grits. In some embodiments, the grit particle size may be greater than 600 grits. In the grit scale, higher grit equates to smaller particle size and hence less surface disruption. The coarseness of surface disruption (and hence the specific grit ground chosen) may depend on the specific device. Finer surface disruption provides less diffusion but also means that less of the surface disruption is visible under magnification. Coarser surface disruption improves diffusion but is more visible under magnification.

In another embodiment, the diffuser screen comprise a holographic diffuser. In further embodiments, the diffuser screen may comprise a micro-structure diffuser. Such diffusers are commonly used in combination with LED lighting units. In still further embodiments, the diffuser may comprise prismatic diffusers.

The viewer device may be provided within a housing. The housing may provide protection for the device as well as mounting for the lenses and screens. The housing may be opaque or substantially opaque. This can beneficially block the entry of unwanted light.

The housing may be elongate, the elongate axis coinciding with the optical axis of the viewer. The housing may be tubular or substantially tubular in form.

The objective lens may be provided within an inlet aperture. The inlet aperture may be provided at a first end of the housing. The eyepiece lens may be provided within an outlet aperture. The outlet aperture may be provided at a second end of the housing, distal to the first end. The outlet aperture may be provided with an eye guard. The eye guard may be wholly or partially resiliently deformable.

The housing may be provided with a mounting clip or adapted to receive a mounting clip. The clip can facilitate connection between the viewer device and another optical device, such as the optical data insertion device.

The objective lens may comprise one or more lens elements. The eyepiece lens may comprise one or more lens elements.

The viewer device may comprise an internal power source. The internal power source may comprise a battery, which may be a rechargeable battery. The viewer device may comprise a cable or connection socket facilitating the powering of an external device. Additionally or alternatively, the viewer device may comprise a connection socket for an external power source.

According to a second aspect of the present invention, there is provided an optical system comprising a viewer device according to the first aspect of the present invention and an optical data insertion device comprising a projector operable to project a visible image and a light guiding device operable to direct light from the projector into the viewer device.

The optical system according to the second aspect of the present invention may incorporate any or all features of the viewer device of the first aspect of the present invention, as required or as appropriate.

The viewer device may be positioned relative to the light guiding device such that the light emitted from the light guiding device is directed substantially into the centre of the objective lens and/or is substantially aligned with the optical axis of the viewer device. This limits the potential for clipping or distortion of the inserted optical data.

The projector may be adapted to project an image captured by another imaging device. The other device may be a device adapted to capture an image in a different wavelength range. In this manner, the light guiding device may be used to generate composite images over an extended wavelength range. In one embodiment, the other imaging device may be operable to capture an infrared image.

In some embodiments, the intensity of light emitted by the projector may be variable. Varying the intensity of the light source emissions can reduce the possibility of the light source output swamping the other light incident on the inlet aperture of the viewer device. This can help to ensure that data from both the light source and the other light incident on the inlet aperture of the viewer device is clearly discernible by a user.

In some embodiments, the projector may be operable to invert optical data prior to projection. In this manner, the optical system can compensate for any image inversion characteristics of the viewer device. In some embodiments, inversion by the projector may be controlled in response to actuation of a user input. In other embodiments, inversion by the projector may be controlled in response to a sensor operable to detect viewer device type. The sensor may be a magnetic sensor. In such embodiments, viewer devices may be provided with characteristic magnetic elements depending upon whether image inversion is required.

The light guiding device may comprise an elongate light transmitting body, the body tapering from a wider end to a narrower end, the wider end adapted to provide a receiving surface for receiving incident light travelling in the first direction and the narrower end adapted to provide an exit aperture orientated to such that light exits the light guiding device in a second, different, direction. The elongate body may be narrow relative to the inlet aperture of the viewing device. The capture surface and/or the exit surface may be provided with one or more lenses adjacent thereto. At least the sides of the solid body may be covered by an opaque layer.

The optical data insertion device may comprise an internal power source. The internal power source may comprise a battery, which may be a rechargeable battery. Additionally or alternatively, the optical data insertion device may comprise a connection socket or cable for an external power source. In some embodiments, the external power source for the optical data insertion device may be an internal power source of the viewer device.

The optical system may additionally comprise a further optical device aligned with the viewer device. In such embodiments, the further optical device and the viewer device may be mounted to a common structure. In such embodiments, the optical system and the further optical device may have fixed mounting position. Alternatively, the optical system and/or the further optical device may be mounted such that relative motion is possible. Typically, relative motion would be facilitated by rotating the optical system and/or the further optical device out of alignment. This permits a user to view through either the optical system or the further optical device as required or as desired. Accordingly, they may be mounted in line with a further optical device or mounted on a rotatable bracket which allows viewing separately either through the further optical device or through the optical data insertion device or can be rotated into an inclined position for combined viewing.

The further optical device may be aligned with and in front of the inlet aperture of the viewer device. In such cases, a user of the viewer device may view the further optical device through the viewer device. Alternatively, the further optical device may be aligned with and behind the outlet aperture of the viewer device. In such cases, a user of the viewer device may view the viewer device through the further optical device.

The further optical device may be a sight. The sight may be a weapon sight. The sight may be a reflector or reflex sight. In particular, the sight may comprise an illumination element. In some embodiments, the sight is a 'red dot' sight. Such sights are common to many weapons.

In some embodiments, an additional further optical device may be provided aligned with and in front of the inlet aperture of the viewer device or aligned with and behind the outlet aperture of the viewer device. In many such embodiments, the additional further optical device is provided at an opposing side of the viewer device to the further optical device. Examples of additional further optical devices may include magnifying lens assemblies or the like. As with the further optical device, the additional further optical device may be mounted in a fixed position relative to the further optical device and/or optical system or may be mounted such that relative motion is possible. Typically, relative motion would be facilitated by rotating the additional further optical device, the optical system and/or the further optical device out of alignment. This rotation may be facilitated by a rotational bracket. This permits a user to view through the additional further optical device, the optical system and/or the further optical device as required or as desired.

According to a third aspect of the present invention, there is provided a directional apparatus comprising an optical system according to the second aspect of the present invention.

The directional apparatus according to the third aspect of the present invention may incorporate any or all features of the optical system according to the second aspect of the present invention and/or the viewer device of the first aspect of the present invention, as required or as appropriate.

The directional apparatus may be any apparatus that is capable of being aimed or operating in a specific direction. For example, the directional apparatus may comprise a suitable sensing system, imaging system or camera, targeting device, weapon or the like. Suitable weapons may include guns, grenade launchers, rocket launchers and the like.

In some such embodiments, the directional apparatus may comprise an internal or external power source. The said power source may comprise a battery, which may be a rechargeable battery. In such cases, the directional apparatus may be operable to supply power to the optical data insertion device via a suitable connection socket and/or connection cable.

In some embodiments, an external power source for the optical system may be mounted to the directional apparatus. The said power source may comprise a battery, which may be a rechargeable battery.

DETAILED DESCRIPTION OF THE INVENTION

In order that the invention may be more clearly understood one or more embodiments thereof will now be described, by way of example only, with reference to the accompanying drawings, of which:

FIG. 1 is an illustration of an image intensifier provided with an optical data insertion device in the form of a clip on attachment, as known from the prior art:

FIG. 2A is an illustration of an optical system comprising a prior art viewer device and an optical data insertion device of the type known from FIG. 1:

FIG. 2B is an illustration of an optical system comprising a viewer device according to the present invention and an optical data insertion device of the type known from FIG. 1:

FIG. 3A is a schematic ray diagram illustrating the structure and operation of the prior art viewer device:

FIG. 3B is a schematic ray diagram illustrating the structure and operation of the viewer device according to the present invention;

Figure 4A:
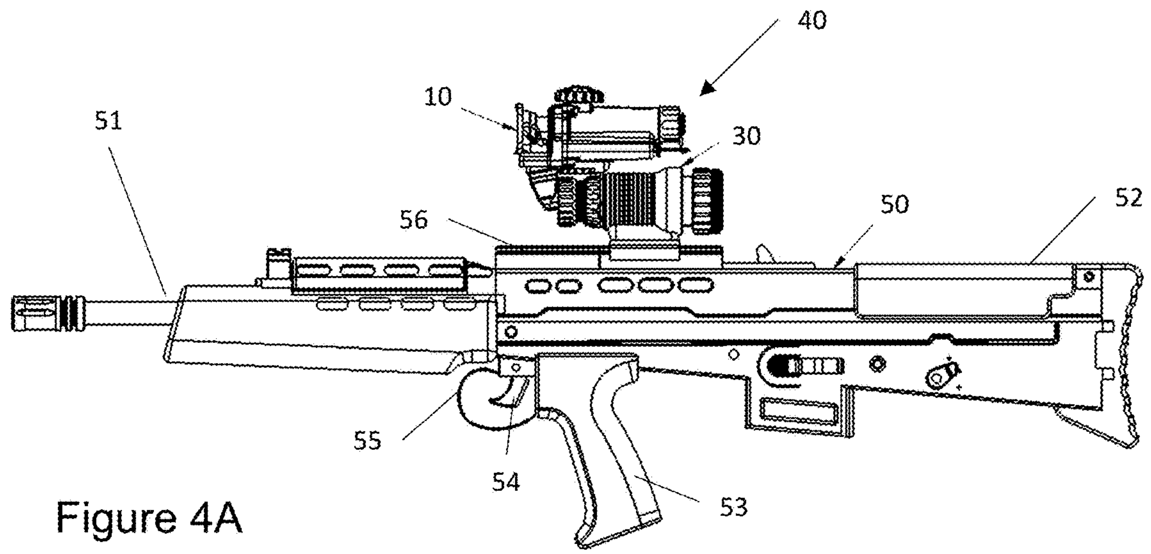
Figure 4B:
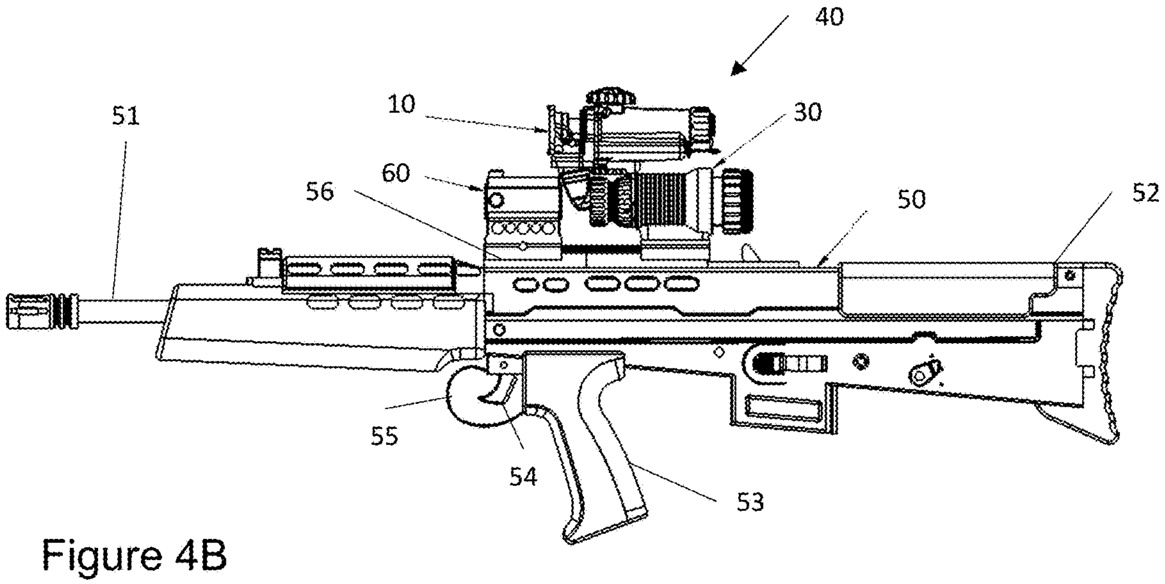
Figure 4C:
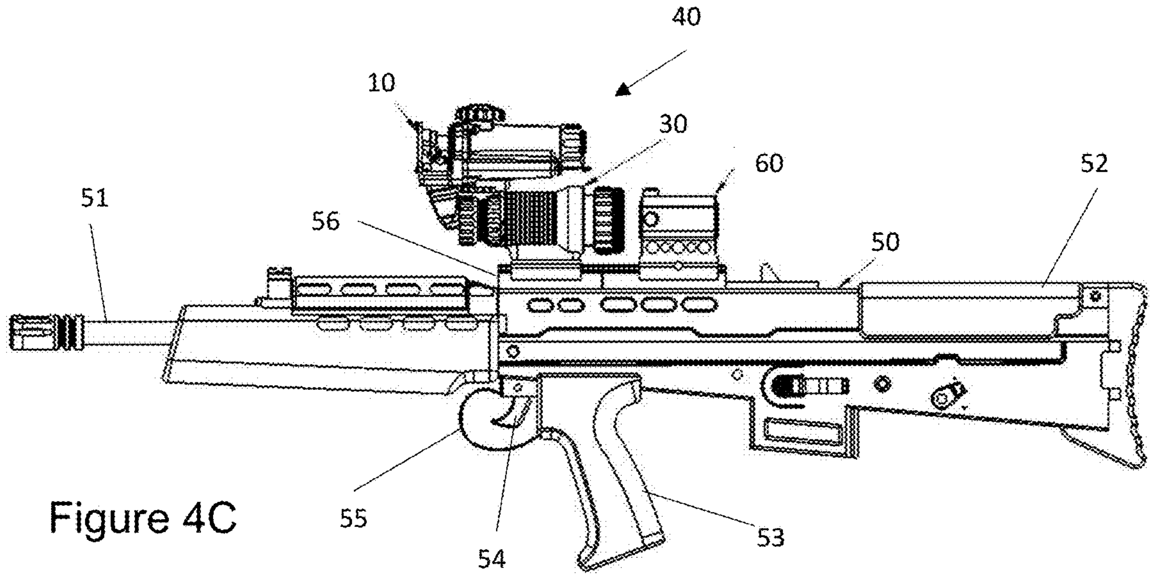
Figure 5A:
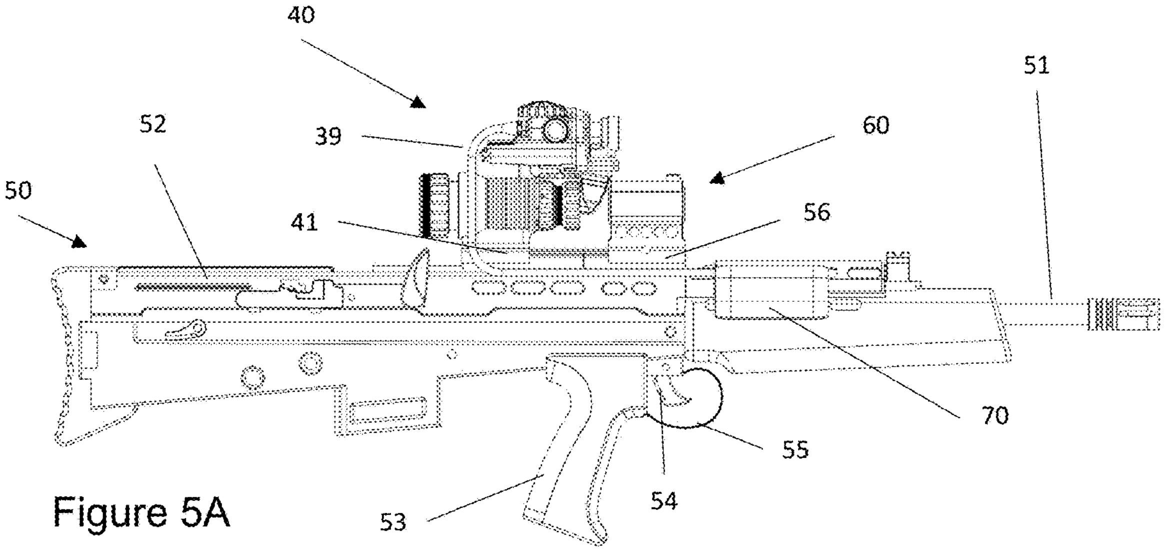
Figure 5B:
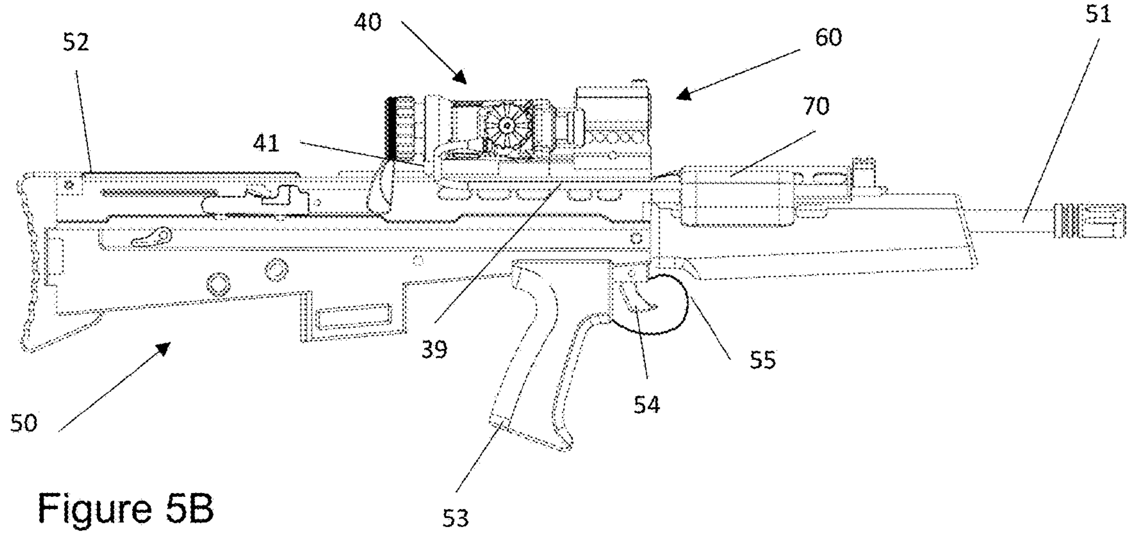
Figure 5C:
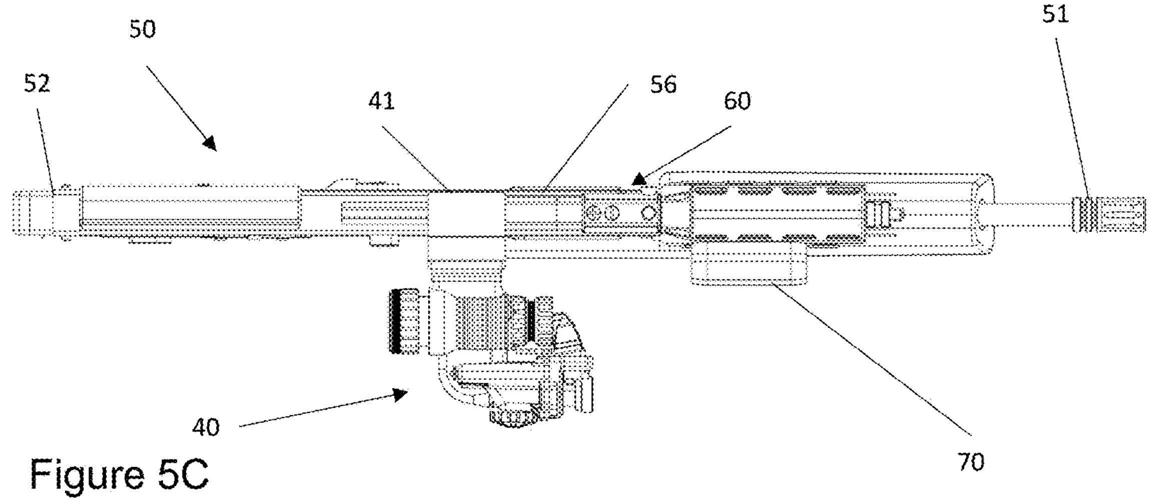

FIG. 4A schematically illustrates an optical system according to the present invention fitted to a weapon in place of a sight:

FIG. 4B schematically illustrates an optical system according to the present invention fitted to a weapon behind a red dot sight:

FIG. 4C schematically illustrates an optical system according to the present invention fitted to a weapon in front of a red dot sight;

FIG. 5A schematically illustrates another embodiment of an optical system according to the present invention rotatably mounted to a weapon behind a red dot sight, in particular illustrates a side view with the optical system in use:

FIG. 5B schematically illustrates another embodiment of an optical system according to the present invention rotatably mounted to a weapon behind a red dot sight, in particular is a side view with the optical system rotated away from use;

FIG. 5C schematically illustrates another embodiment of an optical system according to the present invention rotatably mounted to a weapon behind a red dot sight, in particular is a top view of the optical system rotated away from use:

FIG. 5D schematically illustrates another embodiment of an optical system according to the present invention rotatably mounted to a weapon behind a red dot sight, in particular is a front view the optical system rotated away from use.

Turning to FIG. 1, an optical data insertion device 10 is used to inject optical data into an image intensifier 20. The optical data insertion device 10 can be secured to the image intensifier in use by any suitable means, including the clip 19 illustrated in FIG. 1. An example of such a system is described in more detail in GB2472516A. In summary, the optical data insertion device comprises a thermal imager 11 operable to capture a thermal image in response to infrared light incident on imaging aperture 12 and a projector 13 operable to project a visible image based on that captured by the thermal imager 12. In addition or alternatively, the projector 13 can project other data, for instance alphanumeric ranging data messages or the like. The optical data insertion device 10 further comprises a light guiding device 14.

The light guiding device 14 is adapted to direct light through an exit aperture 15 (not shown in FIG. 1) into and along the optical axis of the inlet aperture 21 of image intensifier 20. The light guiding device 14 is provided with an opaque housing and is constructed to be a thin as possible in order to minimise the obstruction to the inlet aperture 21. Accordingly, the image intensifier 20 will ultimately provide a combined image based on light from the environment incident on inlet aperture 21 and light from the light guiding device 14. The combined image is viewable though outlet aperture 22, which may be protected by an eye guard 23 as illustrated in FIG. 1.

In the example described in GB2472516A, the light guiding device 14 comprises an elongate light transmitting solid body, the body tapering from a wider end to a narrower end. The wider end is adapted to provide a receiving surface for receiving incident light, typically from the projector. The narrower end is adapted to provide an exit surface for said incident light and a reflector is provided adjacent to the narrower end, the reflector adapted to receive said incident light from the exit surface and reflect said incident light through the exit aperture 15. In view of the constrictions on the dimensions of the light guiding device 14, the exit aperture 15 of the light guiding device 14 necessarily is relatively small and hence has a small numerical aperture (NA).

Given the relatively convenient size and weight of the optical data insertion device 10, there is a desire to use the optical data insertion device 10 without the image intensifier 20. Since it impractical to view the exit aperture 15 of the light guiding device 14 the optical data insertion device might typically be clipped to a viewer device 30 using clip 19.

FIG. 2A illustrates a prior art viewer device 30 comprising a substantially tubular housing 31 provided with an inlet aperture 32 at one end and an outlet aperture 33 at another end. The outlet aperture 33 may be provided with an eye guard 34. In use, the inlet aperture 32 is positioned adjacent to and aligned with the exit aperture 15 of the light guiding device 14. As with the example shown in FIG. 1, a light guiding device 14 that is a thin as possible is beneficial to minimise the obstruction to the inlet aperture 32.

FIG. 2B shows a viewer device 30 according to the present invention. The viewer device 30 of FIG. 2B is outwardly similar to the viewer device 30 of FIG. 2A. For example, the viewer device 30 of FIG. 2B comprises a substantially tubular housing 31 provided with an inlet aperture 32 at one end and an outlet aperture 33 at another end. In use, the inlet aperture 32 is positioned adjacent to and aligned with the exit aperture 15 of the light guiding device 14. As before, a light guiding device 14 that is a thin as possible is beneficial to minimise the obstruction to the inlet aperture 32. Unlike the optical data insertion device 10 of FIG. 2A, the optical data insertion device 10 of FIG. 2B is additionally provided with a cable 39 which can provide for an external power and/or data connection. The more important differences between the viewer devices 30 of FIGS. 2A and 2B are in the internal construction as illustrated in FIGS. 3A, 3B and 3C which are described further below.

Figure 2C:
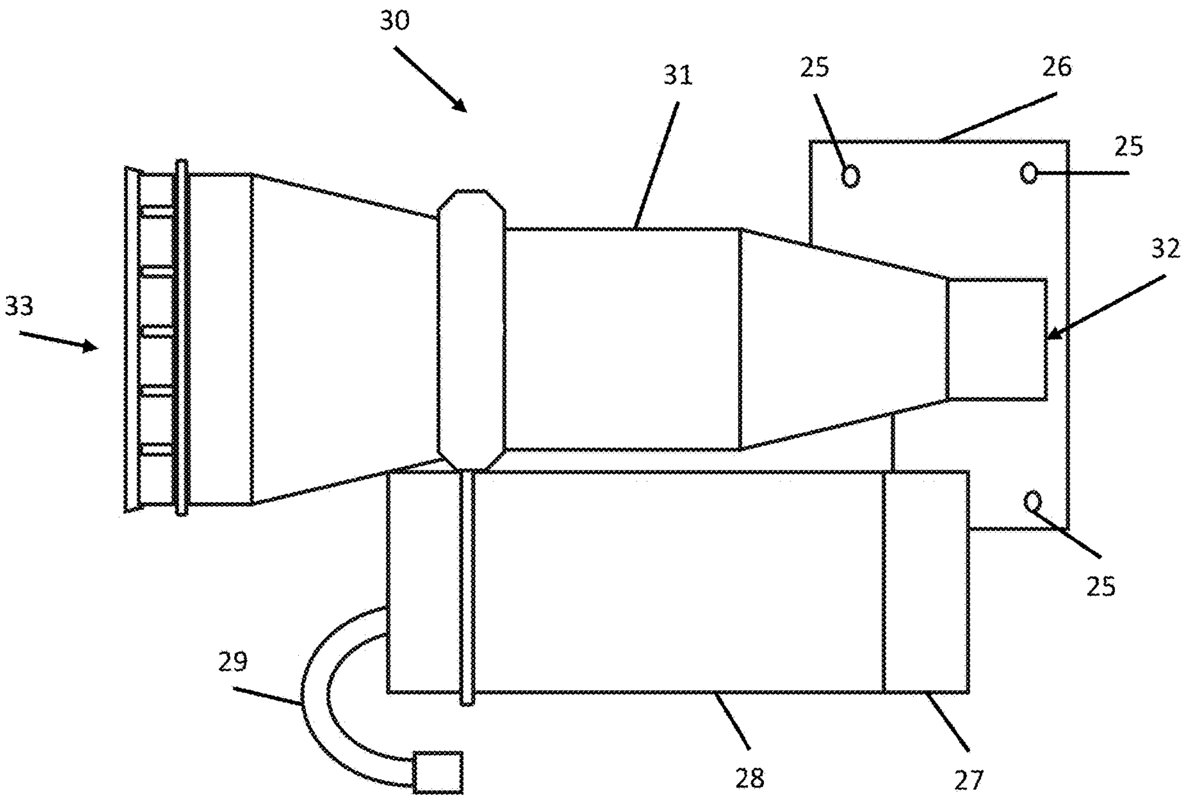
FIG. 2C is an illustration of an alternative optical system comprising a viewer device according to the present invention.
Figure 3C:
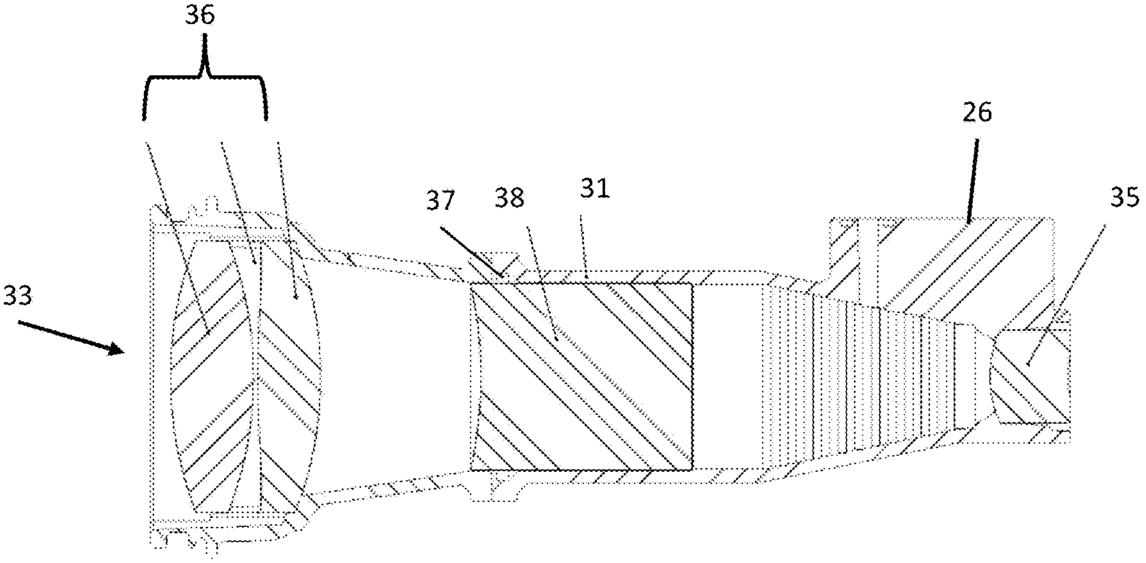
FIG. 3C is a cross-sectional diagram of an alternative embodiment of a viewer device according to the present invention.

FIG. 2C shows another viewer device 30 according to the present invention, without the connected optical data insertion device 10. As compared with the viewer device of FIG. 2B, the viewer device of FIG. 2C additionally comprises an integral battery, within a battery housing 28. The internal battery can be used to provide power to the optical data insertion device 10 via cable 29 and can be accessed by removing battery access cap 27. This arrangement can be more compact and/or more comfortably balanced for a user than providing an integral battery or other power connection for optical data insertion device 10.

Also illustrated in FIG. 2C is an optional connection plate 26 with fitting holes 25. the fitting plate 26 and fitting holes 25 facilitate the viewer device 30 being bolted to an optical data insertion device 10.

Further illustrated in FIG. 2C is a relatively small inlet aperture 32, which optimises the viewer device 30 for direct viewing of the output of optical data insertion device 10.

Turning to FIG. 3A, a ray diagram illustrating the construction and operation of the prior art viewer device 30. The prior art viewer device 30 is provided with an objective lens 35 within the inlet aperture 32 and an eyepiece lens 36 provided within the outlet aperture 33. Each of the objective lens 35 and eyepiece lens 36 can be a single lens (as is the objective lens 35 of FIG. 3) or may be formed from multiple lens elements (as is the case with the eyepiece 36 lens of FIG. 3). A field stop aperture 37 may be provided so as to prevent off axis rays from adversely impacting operation.

In the prior art viewer device 30, the size of the virtual image VI at the eye is determined by the effective aperture size and the magnification of the objective lens 35 and eyepiece lens 36. For a system with unity magnification, the virtual image VI is essentially the same size as the exit aperture of the light guiding device (say ~1.25 mm as in FIG. 3). Accordingly, the inserted data can only be seen if the eye and light guiding device are precisely aligned.

In instances where the viewer device 30 inverts incident light, the projector 13 may be configured to invert projected data. This can compensate for the inversion applied by the viewer device 30. Inversion of projected data can be activated in response to user selection (via a user input—not shown) or detecting the type of viewer device 30. Detection can be achieved by use of a magnetic sensor (not shown) on the optical data insertion device 10 operable to detect a corresponding magnet (not shown) provided on the viewer device 30.

Turning now to FIG. 3B, a ray diagram illustrating the construction and operation of a viewer device 30 according to the present invention is shown. The key difference is that the viewer device 30 of the present invention is provided with a diffuser screen 38. As shown in the example, the diffuser screen 38 is arranged substantially perpendicular to the optical axis of the viewer device 30. As illustrated in FIG. 3B, the diffuser screen 38 is provided within a field stop aperture 37 so as to prevent off axis rays from adversely impacting operation. The diffuser screen 38 is typically provided at the real image plane of the objective lens 35, so as to limit unwanted distortion of the inserted optical data.

In use, as is illustrated in FIG. 3B, the diffuser screen re-emits or scatters the inserted light from each point in the image into a wide cone of light not dependent on the incoming angle of the inserted light. This effectively regenerates an expanded input image with a numerical aperture (NA) equivalent to the size of the diffuser screen 38. The diffuser screen 38 image is thus larger and visible over a wider viewing aperture than would be the case for an image directly based on the exit aperture 15 of the light guiding device 14.

The diffuser screen 38 can optionally be of any suitable type or construction. For example, suitable diffuser screen 38 types/constructions include but are not limited to any one of fibre bundles (which can include elongate fibre bundles, twisted fibre bundles, inverting twisted fibre bundles and/or fibre plates as appropriate), ground glass, holographic diffusers, micro-structure diffusers prismatic diffusers, louvres, and reflectors. In selecting a particular type and specification of diffuser screen 38, the skilled person will bear in mind that coarser diffuser structure provides enhanced diffusion performance, thereby increasing visibility of the virtual image VI but also increases distortion of the virtual image VI. Conversely, finer diffuser structure provides less diffusion and thus a less visible virtual image VI but also means that less of the surface disruption is visible under magnification.

FIG. 3C illustrates shows another viewer device 30 according to the present invention. As compared with the viewer device 30 of FIG. 3C, the diffuser screen 38 is formed from an elongate fibre bundle rather than a thinner diffuser screen such as a fibre plate. Whilst this does result in the viewer device of FIG. 3C having a longer optical axis than would be the case if a thinner diffuser screen was used, this can be beneficial if a longer device 30 is required. More particularly, this allows the use of a diffuser screen 38 comprising a twisted fibre bundle, which has the effect that light incident towards an edge of one end of the twisted fibre bundle is re-emitted from towards an opposing edge of the other end of the twisted fibre bundle. In this manner, the twisted fibre bundle can effectively invert an image. This can be beneficial where it is desired to invert an image and/or to compensate for any image inversion characteristics of the viewer device 30.

Turing now to FIG. 4, examples of the viewer device 30 of the present invention used with the optical data insertion device 10 to provide an optical system 40 according to the present invention. As is illustrated in FIG. 5, the optical system 40 is used with a weapon 50. The skilled person will appreciate that the optical system 40 can equally be used with other directional apparatus for example, sensing systems, imaging systems or cameras, targeting devices or the like.

In the examples of FIG. 4, the weapon 50 is a rifle. In the example shown, the rifle 50 comprises barrel 51 at front end of the rifle 50 and a stock 52 at an opposing end of the rifle 50. Projecting from a lower side of the rifle 50 is a handle 53. Additionally projecting from the lower side of rifle 50 are trigger 54 and trigger guard 55. On an upper side of the rifle 50 is provided a mounting rail 56.

In FIG. 4A, the optical system 40 is fitted to mounting rail 56 and aligned with the barrel 51. Accordingly, the optical system 40 can function as a sight for rifle 50. In such cases, the user of rifle 50 can view an image in visible light of the target area for barrel 51 along with any information (such as an equivalent view in infrared) inserted via optical data insertion device 10.

Turning now to FIG. 4B, the rifle 50 differs only from that of FIG. 5A in that a 'red dot' type sight 60 is also fitted to the mounting rail 56. In this example, the in the red dot sight is positioned in front of the optical system 40 and aligned with the inlet aperture 32 of the viewer device 30. Accordingly, the optical system 40 can relay the view provided by red dot sight 60 to a user, including the red dot indicating alignment of the barrel 51. Additionally, any desired information (such as an equivalent view in infrared) can be inserted via optical data insertion device 10.

Turing now to FIG. 4C, this differs from FIG. 5B in that the red dot sight 60 is positioned behind rather than in front of the optical system 40 and aligned with the outlet aperture 33 of the viewer device 30. Accordingly, the red dot sight 60 relays the image in visible light of the target area viewable though the viewing device and any information (such as an equivalent view in infrared) inserted via optical data insertion device 10 to the user, overlaid with a red dot indicating alignment of the barrel 51.

The selection of whether to have red dot sight 60 in front of optical system 40 as in FIG. 4B or to have red dot sight 60 behind optical system 40 as in FIG. 4C, will depend on preference and/or intended operation.

Turing now to FIG. 5, this illustrates that the optical system 40 can be mounted to the rail 56 by way of a rotatable bracket. This allows the optical system 40 to be rotated relative to red dot sight 60 from an in use position in FIG. 5A to an out of use position shown in FIGS. 5B-5D. This can enable a user to rapidly switch between viewing through both the red dot sight 60 and optical system 40 or just the red dot sight 60.

The skilled person will appreciate that in alternative embodiments, the optical system 40 could rotate toward the other side of the weapon 50. The skilled person would also appreciate that the red dot sight 60 could be mounted to the rail 56 via a rotatable bracket. This might allow a user to rapidly switch between viewing through both the red dot sight 60 and optical system 40 or either device individually Similarly, the skilled person will appreciate that the mounting position of red dot sight 60 and/or optical system 40 can be adjusted relative to each other along the axis of the weapon 50.

FIG. 5 further illustrates the provision of an external power source in the form of a battery 70 for the optical data insertion device 10. The battery can be mounted to the weapon 50 in a convenient location as shown in FIG. 5. The battery 70 can be connected to the optical data insertion device 10 by a power cable 39.

The skilled person will appreciate that in the examples of FIGS. 4 and 5, different weapons could be substituted for the rifle 50. Similarly, the skilled person will appreciate that other types of reflector or reflex sight may be substituted for a red dot sight where appropriate.

The one or more embodiments are described above by way of example only. Many variations are possible without departing from the scope of protection afforded by the appended claims.

The invention claimed is:

1. A viewer device for use with an optical data insertion device comprising a projector operable to project a visible image and a light guiding device having an exit aperture and being operable to direct injected light from the projector into another optical device, the viewer device comprising: an objective lens that, during use of the viewer device, receives the injected light from the exit aperture of the light guiding device and constructs a real image from the injected light within the viewer device, an eyepiece lens and a diffuser screen provided between the objective lens and eyepiece lens, wherein the diffuser screen is designed and configured to, during use of the viewer device, re-emit or scatter the inserted light from a point in the real image constructed by the objective lens, thereby forming an expanded inserted image of the injected light from the exit aperture of the light guiding device that is visible to a viewer via the eyepiece lens over a wider viewing aperture than would be available for the exit aperture of the light guiding device.

2. The viewer device as claimed in claim 1, wherein the diffuser screen is provided at the real image plane of the objective lens.

3. The viewer device as claimed in claim 1, wherein the diffuser screen is provided within a field stop aperture.

4. The viewer device as claimed in claim 1, wherein the diffuser screen comprises a fibre bundle, optionally an elongate fibre bundle or fibre plate.

5. The viewer device as claimed in claim 4, wherein the fibre bundle is a twisted fibre bundle.

6. The viewer device as claimed in claim 1, wherein the diffuser screen comprises ground glass, a holographic diffuser or a micro-structure diffuser.

7. The viewer device as claimed in claim 1, wherein the viewer device is provided within a substantially tubular elongate and substantially opaque housing, optionally wherein the objective lens is provided within an inlet aperture at a first end of the housing and the eyepiece lens is provided within an outlet aperture at a second end of the housing, distal to the first end.

8. The viewer device as claimed in claim 1, wherein the viewer device comprises an internal power source, optionally wherein the viewer device further comprises a cable or connection socket facilitating the powering of an external device.

9. An optical system comprising both the viewer device and the optical data insertion device according to any one of claims 1 to 7.

10. The optical system as claimed in claim 9, wherein the viewer device is positioned relative to the light guiding device such that the light emitted from the light guiding device is directed substantially into the centre of the objective lens and/or is substantially aligned with the optical axis of the viewer device.

11. The optical system as claimed in claim 9, wherein the projector is adapted to project an image captured by another imaging device.

12. The optical system as claimed in claim 9, wherein the light guiding device comprises an elongate light transmitting body, the body tapering from a wider end to a narrower end, the wider end adapted to provide a receiving surface for receiving incident light travelling in the first direction and the narrower end adapted to provide an exit aperture orientated to such that light exits the light guiding device in a second, different, direction.

13. The optical system as claimed claim 9, wherein the optical system comprises a further optical device aligned with the viewer device, optionally wherein the further optical device and the viewer device are mounted to a common structure, optionally wherein the optical system and the further optical device are mounted such that relative motion is possible.

14. The optical system as claimed in claim 13, wherein the further optical device is a sight, optionally wherein the sight is a "red dot" sight.

15. The optical system as claimed in claim 13, wherein an additional further optical device may be provided aligned with and in front of the inlet aperture of the viewer device or aligned with and behind the outlet aperture of the viewer device.

16. A directional apparatus, optionally a weapon, comprising an optical system according to claim 9.

17. The directional apparatus as claimed in claim 16, wherein an external power source for the optical system is mounted to the directional apparatus.

* * * * *